United States Patent
Swope et al.

(10) Patent No.: US 11,804,051 B2
(45) Date of Patent: Oct. 31, 2023

(54) PARALLEL DATA CAPTURE SYSTEM

(71) Applicant: ZEBRA TECHNOLOGIES CORPORATION, Lincolnshire, IL (US)

(72) Inventors: Charles Burton Swope, Coral Springs, FL (US); Stanko Jelavic, Davie, FL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 66 days.

(21) Appl. No.: 16/800,786

(22) Filed: Feb. 25, 2020

(65) Prior Publication Data

US 2021/0264131 A1    Aug. 26, 2021

(51) Int. Cl.
| | |
|---|---|
| G06V 20/64 | (2022.01) |
| G06T 7/11 | (2017.01) |
| G06T 7/62 | (2017.01) |
| G06T 15/06 | (2011.01) |

(52) U.S. Cl.
CPC .............. *G06V 20/64* (2022.01); *G06T 7/11* (2017.01); *G06T 7/62* (2017.01); *G06T 15/06* (2013.01); *G06T 2207/10028* (2013.01); *G06T 2210/12* (2013.01); *G06T 2210/56* (2013.01); *G06V 2201/12* (2022.01)

(58) Field of Classification Search
CPC ............ G06K 9/00201; G06K 2209/40; G06T 15/06; G06T 7/11; G06T 2210/12; G06T 2207/10028; G06T 7/30; G06T 7/62; G06T 2210/56; G06T 19/00; G06T 7/136; G06V 20/64; G06V 2201/12

USPC .......................................................... 382/103
See application file for complete search history.

(56) References Cited

U.S. PATENT DOCUMENTS

| | | | | |
|---|---|---|---|---|
| 9,898,833 | B1* | 2/2018 | Jankevics | G06T 7/62 |
| 2010/0302247 | A1 | 12/2010 | Perez et al. | |
| 2013/0144565 | A1 | 6/2013 | Miller et al. | |
| 2016/0042521 | A1* | 2/2016 | Boardman | G06T 7/62 |
| | | | | 345/420 |
| 2017/0091957 | A1* | 3/2017 | Driegen | G06T 7/62 |
| 2017/0116781 | A1 | 4/2017 | Babahajiani et al. | |
| 2017/0220887 | A1 | 8/2017 | Fathi et al. | |
| 2017/0280125 | A1* | 9/2017 | Brown | G06T 5/50 |

(Continued)

FOREIGN PATENT DOCUMENTS

WO    2015035129 A2    3/2015

OTHER PUBLICATIONS

International Search Report and Written Opinion for International Application No. PCT/US2021/018583 dated May 6, 2021.

(Continued)

*Primary Examiner* — Siamak Harandi
*Assistant Examiner* — Daniella M. DiGuglielmo

(57) ABSTRACT

A server includes a communications interface; and a processor connected with the communications interface, the processor configured to: receive, from each of a plurality of capture nodes: (i) an initial point cloud depicting a portion of a capture volume, and (ii) boundary values corresponding to the initial point cloud; generate a bounding box from the boundary values received from the capture nodes; select respective portions of each initial point cloud based on the bounding box; and combine the selected portions to generate a combined point cloud.

18 Claims, 7 Drawing Sheets

(56) References Cited

U.S. PATENT DOCUMENTS

2018/0122129 A1* 5/2018 Peterson .............. H04N 13/344
2018/0143003 A1* 5/2018 Clayton .................. G06T 7/292
2018/0253857 A1* 9/2018 Driegen ................... G06T 7/62
2019/0096086 A1* 3/2019 Xu ............................ G06T 7/60
2020/0376675 A1* 12/2020 Bai ......................... G06T 7/521

OTHER PUBLICATIONS

Li et al. "Analyzing growing plants from 4D point cloud data." ACM Transactions on Graphics (TOG) 32.6 (2013): 1-10. Nov. 2013 (Nov. 2013) retrieved on Apr. 11, 2021 (Apr. 11, 2021) from <https://dl.acm.org/doi/abs/10.1145/2508363.2508368> entire document.

* cited by examiner

PARALLEL DATA CAPTURE SYSTEM

BACKGROUND

The transportation and storage of objects such as packages may require knowledge of the dimensions of a package. Such information may be employed to optimize the use of available space in a container (e.g. a trailer), to determine a shipping or storage cost for the package, or the like. Package dimensions, however, may not be known in advance, and workers may therefore be required to obtain package dimensions by manually measuring the packages. Taking manual measurements can be time-consuming and error-prone. Systems for automatically measuring package dimensions may also suffer from reduced accuracy, for example, when measuring packages in motion, packages with dark (e.g. black) surfaces, and the like.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
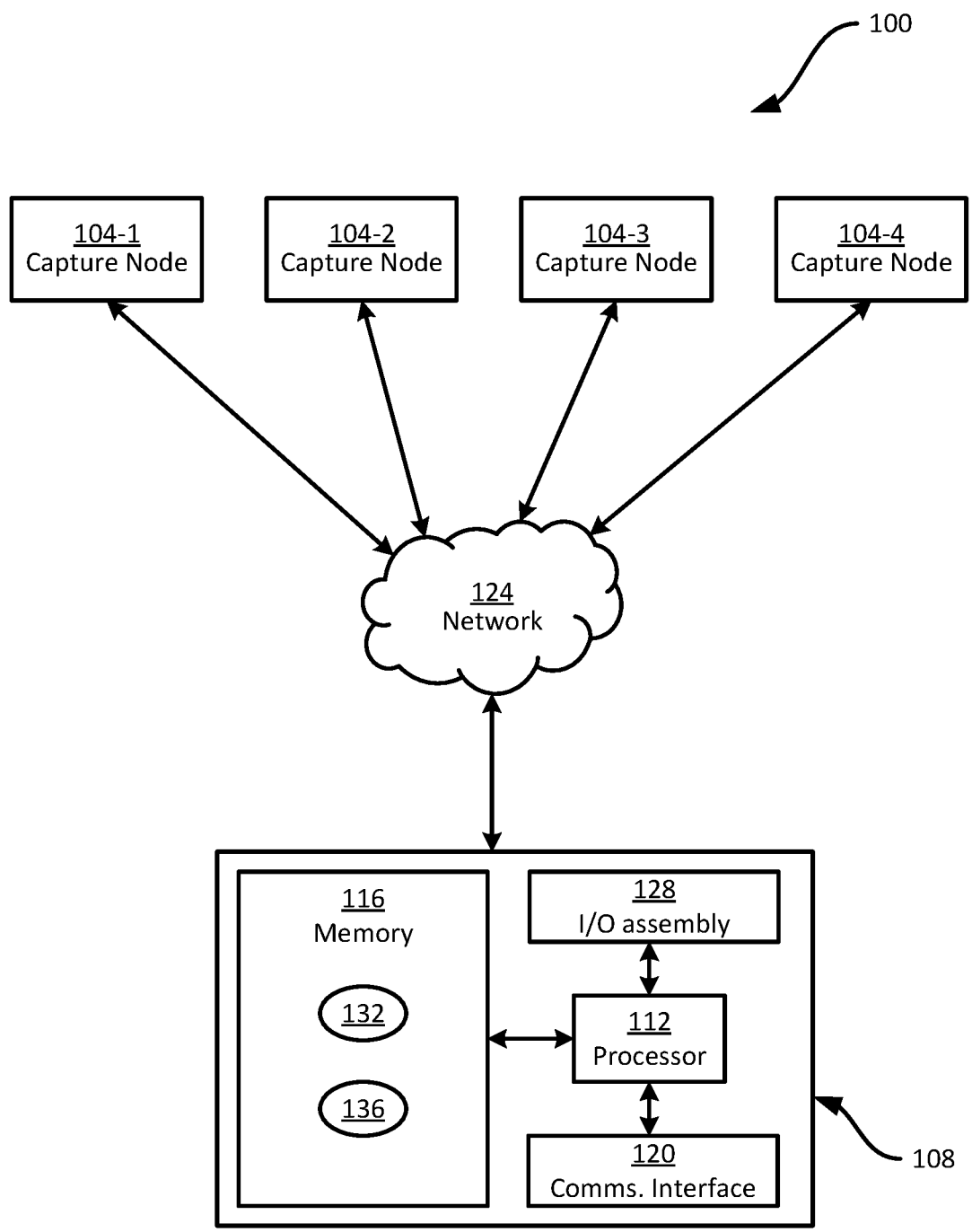
FIG. 1 is a block diagram of an example data capture system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a server including a communications interface; and a processor connected with the communications interface, the processor configured to: receive, from each of a plurality of capture nodes: (i) an initial point cloud depicting a portion of a capture volume, and (ii) boundary values corresponding to the initial point cloud; generate a bounding box from the boundary values received from the capture nodes; select respective portions of each initial point cloud based on the bounding box; and combine the selected portions to generate a combined point cloud.

Additional examples disclosed herein are directed to a method, comprising: receiving at a server, from each of a plurality of capture nodes: (i) an initial point cloud depicting a portion of a capture volume, and (ii) boundary values corresponding to the initial point cloud; generating a bounding box from the boundary values received from the capture nodes; selecting respective portions of each initial point cloud based on the bounding box; and combining the selected portions to generate a combined point cloud.

FIG. 1 depicts a data capture system 100 for object dimensioning. The data capture system is configured to capture image data depicting an object within a capture volume defined by the data capture system 100. The image data (e.g. a set of two-dimensional images captured substantially simultaneously) can be processed to generate a point cloud representing the object to be dimensioned. Dimensions for the object can then be determined based on the point cloud.

In particular, the system 100 includes a plurality of capture nodes 104. In the illustrated example, four capture nodes 104-1, 104-2, 104-3 and 104-4 are shown. In other examples, a greater or smaller number of capture nodes 104 can be provided. As will be discussed in greater detail below, each capture node 104 includes a set of cameras controllable to capture respective images of the above-mentioned capture volume. More specifically, the cameras of each capture node 104 capture images of a given region of the capture volume. Together, the regions of coverage of the capture nodes 104 encompass substantially the entire capture volume. From the images captured by the cameras of a given node 104, a computing device associated with that node 104 generates a point cloud (e.g. via the execution of a photogrammetry application or other suitable point cloud generation mechanism).

In the illustrated example, therefore, the capture nodes 104 produce four point clouds, each depicting a respective region of the capture volume containing the object. The regions, and therefore the point clouds generated at the capture nodes 104, generally overlap at the boundaries thereof.

The system 100 also includes a data capture server 108, also referred to simply as the server 108. The server 108 is connected to the computing devices of each of the capture nodes 104, and receives the above-mentioned point clouds from the capture nodes 104. The server 108 is configured, as will be described in greater detail below, to combine the point clouds from the capture nodes 104 to produce a single point cloud depicting at least a portion of the capture volume. The server 108 can then detect the object within the combined point cloud and determine dimensions for the object.

Generating point clouds for regions of the capture volume at the individual capture nodes 104, and combining the node-specific point clouds at the server 108, enables the computationally demanding task of point cloud generation to be parallelized. Such parallelization may enable the system 100 to generate a complete point cloud and determine dimensions for the object in the capture volume more quickly than in a system in which point cloud generation is performed at a single device, based on the complete set of images from all cameras.

FIG. 1 also illustrates certain internal components of the server 108. The server 108 includes a central processing unit (CPU), also referred to as a processor 112, interconnected with a non-transitory computer readable storage medium, such as a memory 116. The memory 116 includes any suitable combination of volatile memory (e.g. Random Access Memory (RAM)) and non-volatile memory (e.g. read only memory (ROM), Electrically Erasable Programmable Read Only Memory (EEPROM), flash) memory. The processor 112 and the memory 116 each comprise one or more integrated circuits (ICs).

The server 108 also includes a communications interface 120, enabling the server 108 to exchange data with other computing devices, for example via a network 124. The communications interface 120 therefore includes any suitable hardware (e.g. transmitters, receivers, network interface controllers and the like) allowing the server 108 to communicate over the network 124.

The server 108 can also 124 further includes an input/output assembly 128, which can include a suitable combination of input devices (e.g. a keyboard, a mouse, a microphone, or the like) and output devices (e.g. a display, a speaker or the like). The components of the server 108 are interconnected by communication buses (not shown), and powered by a battery or other power source, over the above-mentioned communication buses or by distinct power buses (not shown).

The memory 116 of the server 108 stores a plurality of applications, each including a plurality of computer readable instructions executable by the processor 112. The execution of the above-mentioned instructions by the processor 112 causes the server 108 to implement certain functionality, as discussed herein. The applications are therefore said to be configured to perform that functionality in the discussion below. In the present example, the memory 116 of the server 108 stores a point cloud generator application 132, and a dimensioning application 136 (also referred to herein simply as the applications 132 and 136, respectively).

The server 108 is configured, via execution of the application 132 by the processor 112, to obtain point clouds from at least a subset of the capture nodes 104 (up to and including all of the capture nodes 104), and to generate a combined point cloud therefrom. Via execution of the application 136, the server 108 can be configured to detect an object within the combined point cloud and determine dimensions for the object.

The applications 132 and 136 can, in other examples, be implemented as a single application, or as more than two applications. In other examples, the processor 112, as configured by the execution of the applications 132 and 136, is implemented as one or more specifically-configured hardware elements, such as field-programmable gate arrays (FPGAs) and/or application-specific integrated circuits (ASICs). In further examples, the functionality implemented by the server 108 via the execution of an application, such as the application 136, can be implemented by a separate computing device, such as a dimensioning server accessible via the network 124, rather than by the server 108.

Figure 2:
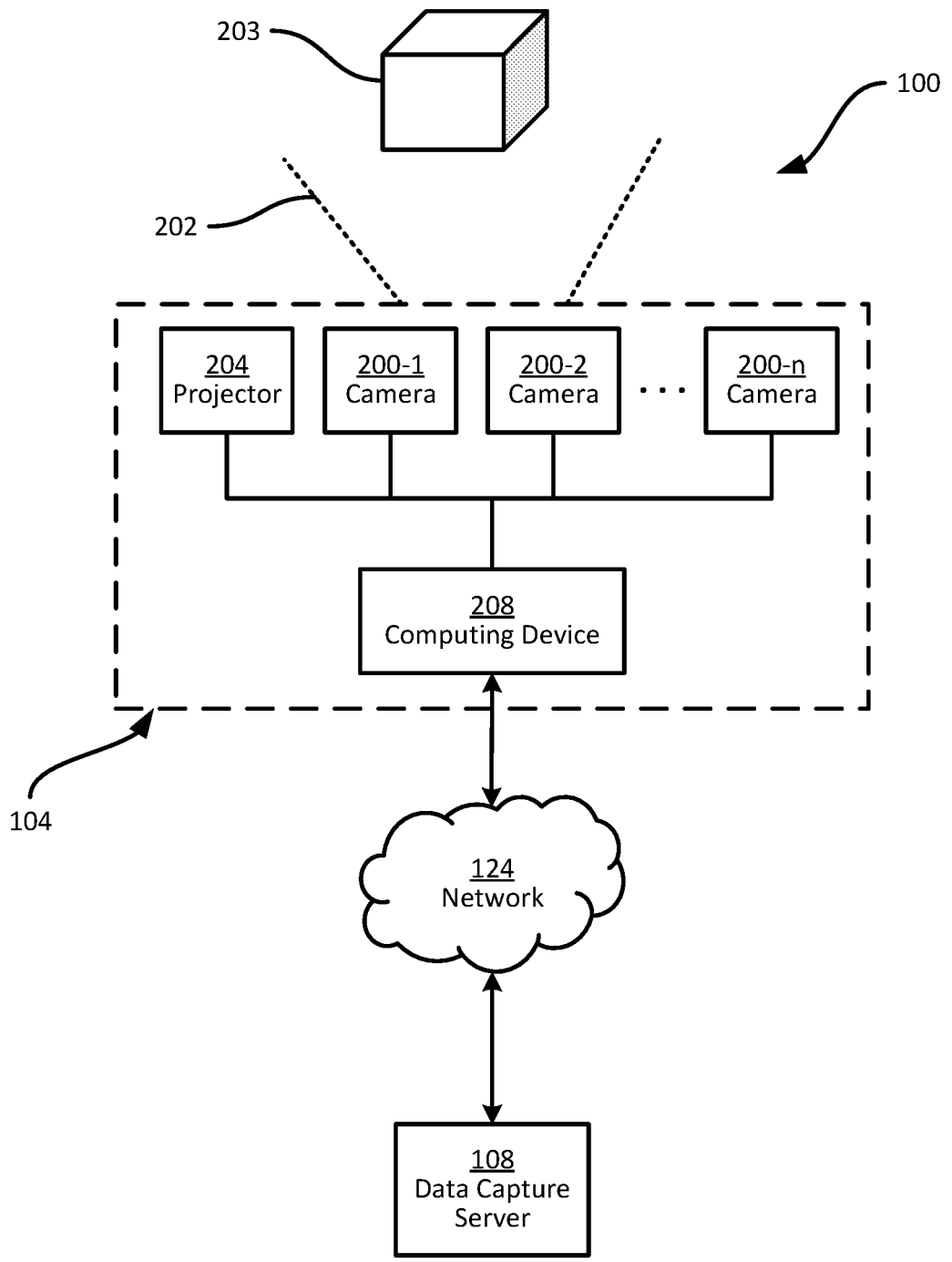
FIG. 2 is a block diagram illustrating additional components of the system of FIG. 1.

Turning to FIG. 2, example components of a capture node 104 are shown. Each of the capture nodes 104 shown in FIG. 1 can include the components illustrated in FIG. 2 and discussed below.

The capture node 104 includes a plurality of image sensors 200-1, 200-2, ... 200-n. For example, each capture node 104 may include four image sensors 200. The image sensors 200 may also be referred to as cameras 200. Each camera 200 has a distinct field of view (FOV), as the cameras 200 are placed at distinct physical positions relative to one another. The FOVs of the cameras 200 of a given capture node 104 overlap (e.g. by 40%, although greater and smaller overlaps are also contemplated). FIG. 2 illustrates an FOV 202 for the capture node 104 as a whole. The FOV 202 encompasses a region of the capture volume for which the capture node 104 can generate a point cloud. The point cloud may depict at least a portion of an object 203 within the capture volume.

The capture node 104 also includes a projector 204. In other examples, multiple projectors 204 may be included in the capture node 104. In further examples, certain capture nodes 104 may include one or more projectors 204, while other capture nodes may omit the projector 204. The projector 204 is controllable to project a structured light pattern onto the capture volume, e.g. to illuminate the object 203 within the capture volume. The structured light pattern can be selected to be readily detectable in images captured by the cameras 200, to facilitate generation of the point cloud mentioned above. The structured light pattern may therefore be based on any suitable image, recurring pattern, or the like. In other examples, the structured light pattern can be implemented as a randomized set of regions of varying intensity and/or color.

The capture node 104 also includes a computing device 208 connected with the cameras 200 and the projector 204. The computing device 208 can control the cameras 200 to capture images of the capture volume within the FOV 202, while the projector 204 illuminates the capture volume. The computing device 208 also generates a point cloud from the images captured by the cameras 200. As will now be apparent, the point cloud represents a portion of the capture volume, and therefore may represent some, all or none of the object 203 (depending on the position of the object 203 within the capture volume).

Figure 3:
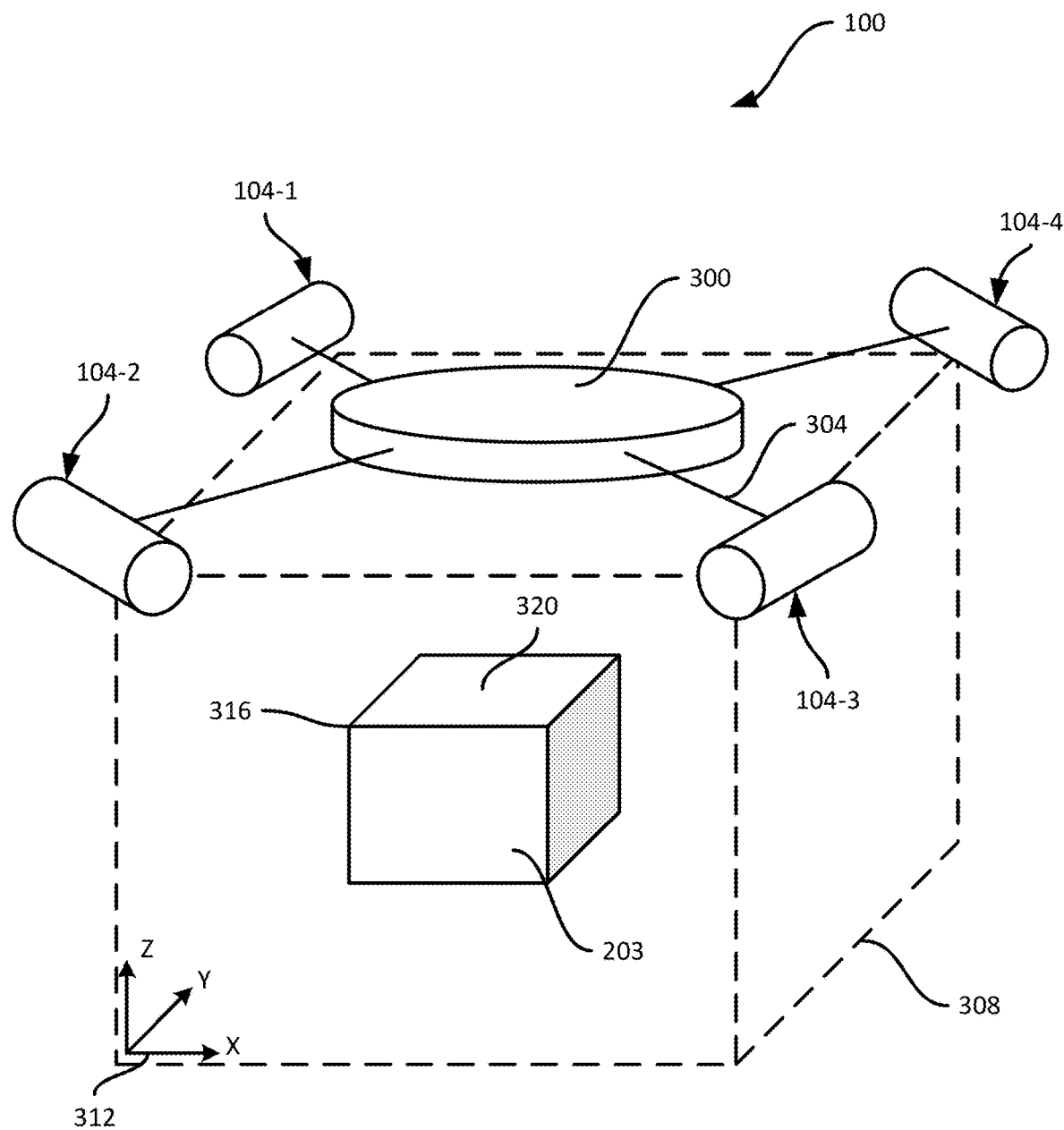
FIG. 3 is a diagram illustrating an example implementation of the data capture system of FIG. 1.

Turning to FIG. 3, certain components of the system 100 are shown in an example deployment. The example deployment shown in FIG. 3 includes the four capture nodes 104 mentioned above, e.g. with the cameras 200 and projector 204 of each node 104 contained within a substantially cylindrical housing. A wide variety of other structural arrangements may also be employed for each node 104.

The nodes 104 are supported, e.g. by a central support structure 300 connected with the nodes 104 via conduits 304. The nodes 104 can also be supported by support members extending from a ceiling (not shown) of the facility. The conduits 304, when used in the system 100, can carry communications lines and cooling fluid (e.g. conditioned air or the like). The central support structure 300 can therefore contain cooling or other conditioning equipment, and may also contain the server 108.

As noted earlier, the cameras 200 of the nodes 104 are positioned such that the field of view of each camera 200 encompasses at least a portion of a capture volume 308, such as a 10×10×10 foot volume. Further, the fields of view of adjacent cameras 200 within each node 104 overlap, e.g. by about 40%. Together, the cameras 200 thus provide substantially complete coverage of the capture volume 308 (e.g. each position in the capture volume 308 is within the field of view of at least two cameras 200).

The object 203 may be placed within the capture volume 308 to remain stationary during capture and dimensioning, or the object 203 may be transported through the capture volume 308 via any suitable locomotive mechanism. The system 100, in other words, may dimension the object 203 at rest or in motion, and may dimension the object 203 in motion in a variety of directions (e.g. the forklift need not enter the capture volume 308 at a fixed point). Example locomotive mechanisms include a forklift or other vehicle, a conveyor belt, and the like. The system 100 is configured to detect when the object 203 has entered the capture volume 308, and in response to such detection, to control components thereof in order to configure the projectors 204 and cameras 200, capture images with the cameras 200, and generate point cloud data.

In particular, the computing device 208 of each node 104 is configured to generate a point cloud from the images captured by the cameras 200 of that node 104. The point cloud generated by a given node 104 thus depicts a portion of the capture volume 308 corresponding to the FOV 202 of that node 104. The point clouds generated by the nodes 104 may use a local frame of reference specific to each node 104, or may use a common frame of reference 312 established for the capture volume 308 when the system 100 is deployed. When the nodes 104 generate point clouds using the common frame of reference 312, the computing device 208 of each node 104 can store calibration data defining the physical position of the cameras 200 of that node 104 relative to the origin of the common frame of reference 312. When the nodes 104 employ local frames of reference, the server 108 can register the node-specific point clouds to the common frame of reference 312 using calibration data.

As will be apparent from FIG. 3, the FOV 202 of each node 104 encompasses a different portion of the capture volume 308. Further, within the portion of the capture volume 308 visible to a given node 104, elements that are physically closer to the node 104 may be more accurately captured (i.e. represented in the resulting point cloud data) than elements that are physically further from the node 104. For example, a corner 316 and a center 320 of a top surface of the object 203 may be visible to the node 104-2, but the corner 316 may be more accurately represented in the point cloud generated by the node 104-2 than the center 320.

Figure 4:
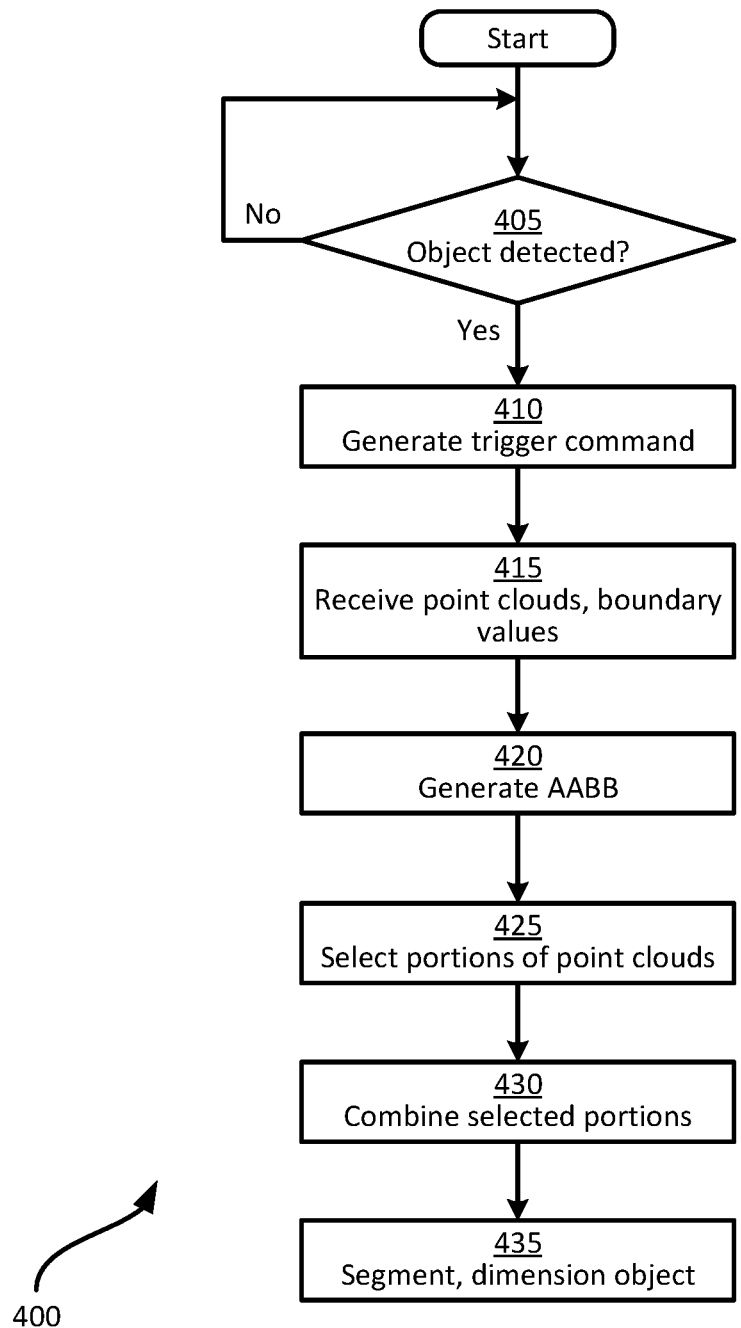
FIG. 4 is a flowchart of a data capture method for object dimensioning.

Turning to FIG. 4, a method 400 of data capture for object dimensioning is illustrated. The method 400 will be described in conjunction with its performance in the system 100, and in particular by the server 108. In general, performance of the method 400 enables the server 108 to obtain individual point clouds from the nodes 104, each representing a portion of the capture volume 308, and to generate a combined point cloud according to the common frame of reference 312. From the combined point cloud, the server 108 may then determine dimensions for the object 203.

At block 405, the server 108 is configured to determine whether an object (e.g. the object 203) is detected within the capture volume 308, or adjacent to the capture volume 308. Object detection at block 405 can be based on any of a variety of suitable trigger mechanisms. For example, a lidar sensor, IR sensor or the like disposed near the perimeter of the capture volume 308 may generate a detection signal when the object 203 enters the capture volume 308. In other examples, at least one of the nodes 104 can be configured to transmit a stream of images captured via at least one camera 200 to the server 108. The server 108 can process the images to detect objects in motion therein. When the determination at block 405 is affirmative, the server proceeds to block 410. When the determination at block 405 is negative, the server 108 can repeat the performance of block 405.

At block 410 the server 108 generates a trigger command to cause at least one of the nodes 104 to capture images and generate a point cloud therefrom. For example, the server 108 may select a subset of the nodes 104, or all of the nodes 104 (e.g. in the case of moving objects), and transmit a trigger command to each selected node 104. At each node 104 that receives the trigger command, the corresponding computing device 208 controls at least a subset of the cameras 200 to capture images substantially simultaneously, and generates a point cloud from the images via the execution of a suitable point cloud generation mechanism (e.g. a photogrammetry application or the like).

Each computing device 208 also, in response to generating a point cloud, identifies boundary values in the point cloud. In particular, the boundary values for each node 104 include a first boundary value in a first dimension, and a second boundary value in a second dimension. In the present example, the first and second dimensions mentioned above are the X and Y dimensions of the frame of reference 312 shown in FIG. 3. That is, the first and second dimensions are horizontal dimensions, as contrasted with the vertical Z axis of the frame of reference 312.

The boundary values selected by the nodes 104 (i.e. by the computing devices 208 each the nodes 104) are maximal or minimal values from the point cloud in each of the above-mentioned dimensions. In other words, each computing device 208 identifies, as a first boundary value, either the greatest or smallest X-axis coordinate present in the point cloud. Each computing device 208 also identifies, as a second boundary value, either the greatest or smallest Y-axis coordinate present in the point cloud.

Whether a given node 104 is configured to detect minimal or maximal values depends on per-node configuration established when the system 100 is deployed, and on the frame of reference 312. The boundary values, as will be discussed below, are employed by the server 108 to generate an axis-aligned bounding box that contains any objects represented in the point clouds from the nodes 104.

Figure 5:
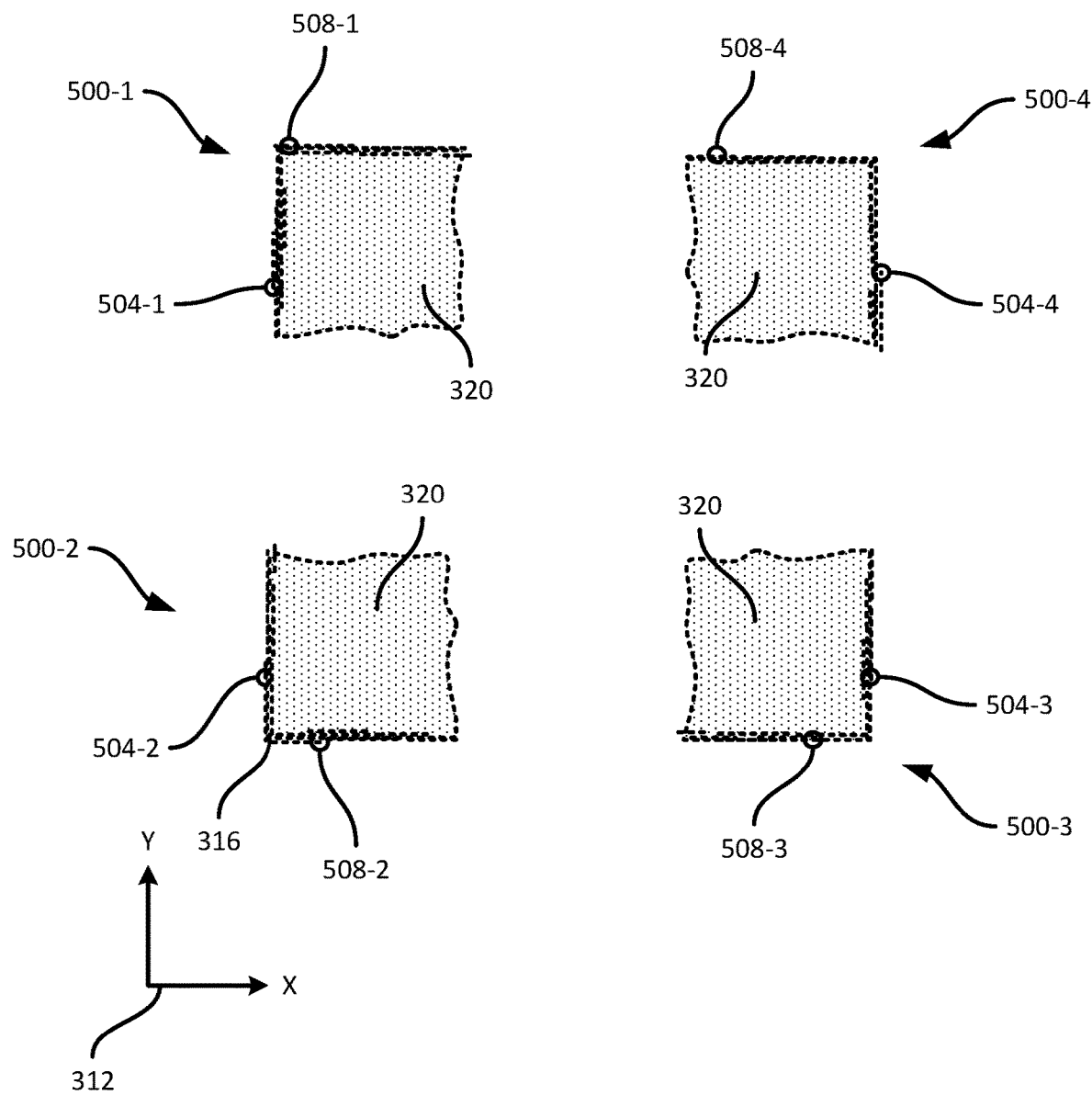
FIG. 5 is a diagram illustrating example point clouds generated by capture nodes of the system of FIG. 1.

Turning to FIG. 5, four example point clouds 500-1, 500-2, 500-3 and 500-4, generated by the nodes 104-1, 104-2, 104-3 and 104-4 respectively, are shown. The point clouds 500 are shown in an overhead view, as indicated by the frame of reference 312 reproduced in FIG. 5. The point clouds 500 are also separated for visibility, whereas in reality each point cloud 500 depicts a portion of the object 203 that overlaps with the other point clouds 500. In particular, the center 320 of the top surface of the object 203 is labelled in each of the point clouds 500, illustrating that although no point cloud 500 depicts the entire object 203, the point clouds 500 overlap with one another to a degree.

The boundary values selected by each node 104 correspond to the furthest extents of the point clouds. Thus, the node 104-2 identifies a minimum X value 504-2 and a minimum Y value 508-2. It will be understood that the values 504-x1 and 504-y1 are minimal relative to the frame of reference 312, which indicates that X and Y values increase toward the top and right of FIG. 5. The node 104-1 identifies a maximum Y value 508-1 and a minimum X value 504-1. The node 104-3 identifies a maximum X value 504-3 and a minimum Y value 508-3, and the node 104-4 identifies a maximum X value 504-4 and a maximum Y value 508-4.

Returning to FIG. 4, having generated the trigger command and sent the trigger command to the nodes 104 to initiate point cloud generation at the nodes 104, the server 108 proceeds to block 415. At block 415, the server 108 is configured to receive the point clouds 500 from each of the nodes 104, as well as the above-mentioned boundary values. The point clouds 500 (which may also be referred to as initial point clouds) and boundary values can be stored in the memory 116 for further processing.

Figure 6A:
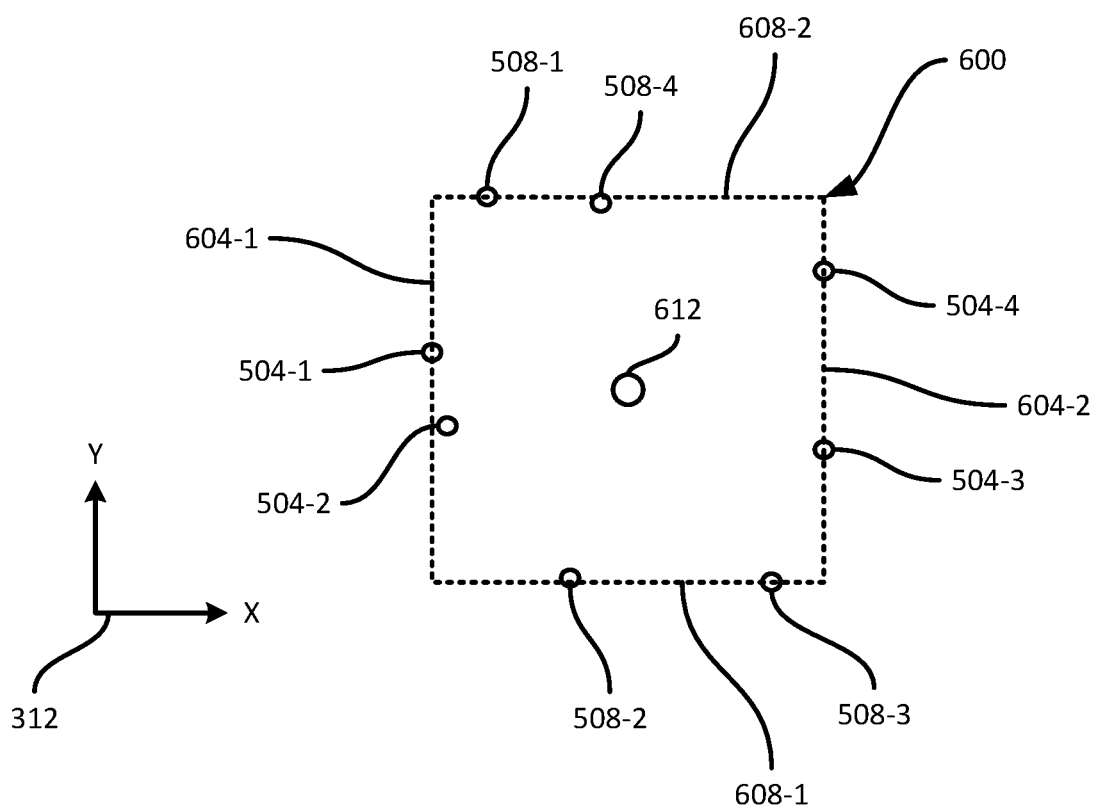
FIG. 6A is a diagram illustrating the generation of a bounding box during the performance of the method of FIG. 4.

At block 420, the server 108 is configured to generate an axis-aligned bounding box (AABB) based on the boundary values received at block 415. In particular, the server 108 is configured to translate the boundary values into the frame of reference 312 (if they are not already in the frame of reference 312 in the form they are received from the nodes 104). As shown in FIG. 6A, once placed in the frame of reference 312, the boundary values 504 and 508 indicate positions on the edges of the object 203 (which, in the present example, is the only object present in the capture volume 308).

The server 108 is configured to generate an AABB 600 by defining first and second planar surfaces 604-1 and 604-2 at positions along the X axis based on the boundary values 504. As illustrated in FIG. 6A, the surface 604-1 is placed at the position corresponding to the minimum boundary value 504 (the value 504-1 in this example). The surface 604-2 is placed at the position corresponding to the maximum boundary value 504 (the values 504-3 and 504-4 in this example, which are equal).

The server 108 is further configured to define third and fourth planar surfaces 608-1 and 608-2 at positions along the Y axis based on the boundary values 508. The surface 608-1 is placed at the position corresponding to the minimum value among the boundary values 508 (i.e. the value 508-3 in the illustrated example). The surface 608-2 is placed at the position corresponding to the maximum value among the boundary values 508 (i.e. the value 508-1 in the illustrated example).

The AABB 600 thus encloses a region of undetermined height (i.e. dimension along the Z axis). Referring again to FIG. 4, at block 425 the server 108 is configured to select a portion of each point cloud 500 based on the AABB 600. In particular, referring to FIG. 6A, the server 108 determines a center 612 of the AABB 600, and applies margins in each of the first and second dimensions (i.e. the X and Y dimensions, in the present example). The margins and the AABB 600 define respective portions of the point clouds 500 to be selected at block 425.

Figure 6B:
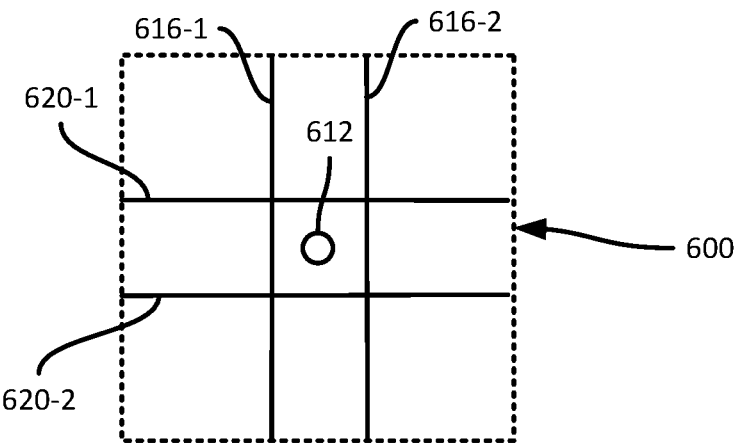
FIG. 6B is a diagram illustrating the generation of cutting planes at block 425 of the method of FIG. 4.

Example margin planes are shown in FIG. 6B. In particular, margins 616-1 and 616-2 are substantially vertical planes placed at positions along the X axis that are at predefined distances from the center 612. Margins 620-1 and 620-2 are substantially vertical planes placed at positions along the Y axis that are at predefined distances from the center 612. The predefined distances mentioned above are selected such that the selected portions of the point clouds 500 overlap at their inner edges (i.e. adjacent to the center 612). Such overlap provides additional point cloud resolution which may increase the accuracy of the resulting combined point cloud.

Figure 7A:
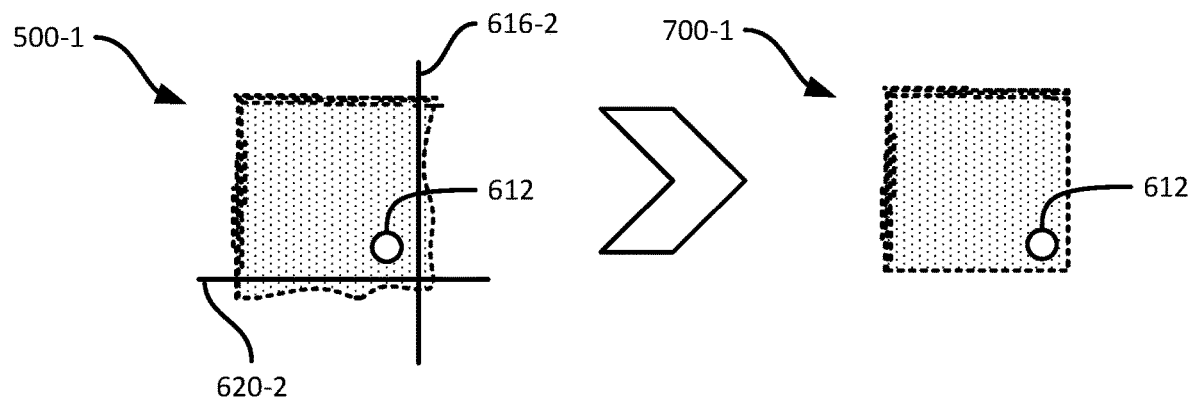
FIG. 7A is a diagram illustrating the selection of a portion of a point cloud at block 425 of the method of FIG. 4.

Turning to FIG. 7A, a performance of block 425 for the point cloud 500-1 is illustrated. In particular, the center 612 and margins 616-2 and 620-2 are shown superimposed over the point cloud 500-1. The margins 616-2 and 620-2 serve as cutting planes to select a portion 700-1 of the point cloud 500-1. A similar selection operation is performed for each of the remaining point clouds 500. The cutting planes for the point cloud 500-2 are the margins 616-2 and 620-1. The cutting planes for the point cloud 500-3 are the margins 616-1 and 620-1, and the cutting planes for the point cloud 500-4 are the margins 616-1 and 620-2.

Figure 7B:
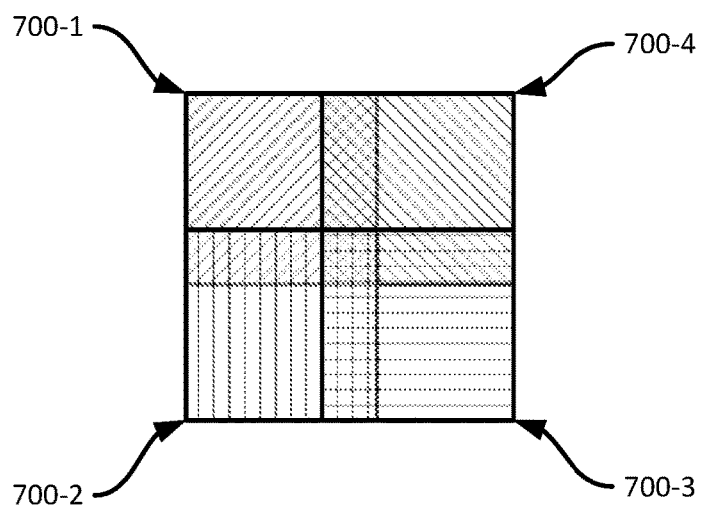
FIG. 7B is a diagram illustrating a combined point cloud generated from respective portions of point clouds generated by the capture nodes of the system of FIG. 1.

FIG. 7B illustrates portions 700-1, 700-2, 700-3 and 700-4 selected from the point clouds 500. The outer boundary of the portions 700 corresponds to the perimeter of the AABB 600, and as shown in FIG. 7B the portions 700 overlap between the margins 616 and 620.

Returning to FIG. 4, at block 430 the server 108 combines the selected portions 700 of the point clouds 500. Combination can include simply concatenating the portions 700 into a single point cloud. In other examples, the combination of the portions 700 at block 430 can include averaging nearby points from separate portions 700 (e.g. in the overlapping regions shown in FIG. 7B).

At block 435, having generated a combined point cloud, the server 108 can be configured to segment the object 203 within the combined point cloud according to a suitable plane or object detection mechanism. Segmentation of the combined point cloud to detect the object 203 and remove other objects (e.g. a forklift carrying the object 203) are beyond the scope of the present disclosure. The server 108 may also determine one or more dimensions (e.g. height, width and/or length) of the object 203. In general, the server 108 can apply plane-fitting operations or other detection algorithms to the combined point cloud to detect a bounding box corresponding to the object 203. The server 108 may also apply noise reduction mechanisms to the combined point cloud (e.g. a bilateral filter).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A server, comprising:
a communications interface connecting the server with a plurality of capture nodes, each capture node including (i) a plurality of cameras having overlapping fields of view directed towards a capture volume having an object present therein, and (ii) at least one computing device configured to obtain two-dimensional images via the cameras and generate an initial point cloud from the two-dimensional images depicting at least a portion of the capture volume; and
a processor connected with the communications interface, the processor configured to:
receive, from the at least one computing device: (i) the initial point cloud, and (ii) boundary values corresponding to the initial point cloud;
generate a bounding box from the boundary values received from the at least one computing device;
select respective portions of each initial point cloud based on the bounding box; and
combine the selected portions of each initial point cloud to generate a combined point cloud.

2. The server of claim 1, further comprising a memory; wherein the processor is further configured to:
retrieve calibration data from the memory; and
register the initial point clouds to a common frame of reference according to the calibration data.

3. The server of claim 1, wherein the boundary values include:
at least a first value defining a minimum extent in a first dimension;
at least a second value defining a maximum extent in the first dimension;
at least a third value defining a minimum extent in a second dimension; and
at least a fourth value defining a maximum extent in the second dimension.

4. The server of claim 3, wherein the first and second dimensions are horizontal.

5. The server of claim 4, wherein the processor is further configured, in order to generate the bounding box, to:
generate a first vertical surface based on the first value;
generate a second vertical surface based on the second value;
generate a third vertical surface based on the third value; and
generate a fourth vertical surface based on the fourth value.

6. The server of claim 3, wherein the boundary values received from the capture nodes include a plurality of minimum boundary values defining minimum extents in the first dimension; and
wherein the processor is further configured to select the first value from the plurality of values.

7. The server of claim 1, wherein the processor is further configured, in order to select the respective portions of each initial point cloud, to:
determine a center of the bounding box;
generate a set of cutting planes based on the center; and
for each initial point cloud, select the respective portion based on the bounding box and a subset of the cutting planes.

8. The server of claim 1, wherein the processor is further configured, prior to receiving the initial point clouds, to detect the object present in the capture volume and generate a trigger command for transmission to the capture nodes.

9. The server of claim 1, wherein the processor is further configured to determine, based on the combined point cloud, a dimension of the object present in the capture volume.

10. A method, comprising:
at a server, connecting with a plurality of capture nodes, each capture node including (i) a plurality of cameras having overlapping fields of view directed towards a capture volume having an object present therein, and (ii) at least one computing device configured to obtain two-dimensional images via the cameras and generate an initial point cloud from the two-dimensional images depicting at least a portion of the capture volume;
receiving at the server, from the at least one computing device: (i) the initial point cloud, and (ii) boundary values corresponding to the initial point cloud;
generating a bounding box from the boundary values received from the at least one computing device;
selecting respective portions of each initial point cloud based on the bounding box; and combining the selected portions of each initial point cloud to generate a combined point cloud.

11. The method of claim 10, further comprising:
retrieving calibration data; and
registering the initial point clouds to a common frame of reference according to the calibration data.

12. The method of claim 10, wherein the boundary values include:
at least a first value defining a minimum extent in a first dimension;
at least a second value defining a maximum extent in the first dimension;
at least a third value defining a minimum extent in a second dimension; and
at least a fourth value defining a maximum extent in the second dimension.

13. The method of claim 12, wherein the first and second dimensions are horizontal.

14. The method of claim 13, wherein generating the bounding box comprises:
generating a first vertical surface based on the first value;
generating a second vertical surface based on the second value;
generating a third vertical surface based on the third value; and
generating a fourth vertical surface based on the fourth value.

15. The method of claim 12, wherein
the boundary values received from the capture nodes include a plurality of minimum boundary values defining minimum extents in the first dimension;
the method further comprises selecting the first value from the plurality of values.

16. The method of claim 10, wherein selecting the respective portions of each initial point cloud comprises:
determining a center of the bounding box;
generating a set of cutting planes based on the center; and
for each initial point cloud, selecting the respective portion based on the bounding box and a subset of the cutting planes.

17. The method of claim 10, further comprising, prior to receiving the initial point clouds,
detecting the object present in the capture volume and generating a trigger command for transmission to the capture nodes.

18. The method of claim 10, further comprising: determining, based on the combined point cloud, a dimension of the object present in the capture volume.

\* \* \* \* \*